US009089771B2

(12) United States Patent
Aggarwal et al.

(10) Patent No.: US 9,089,771 B2
(45) Date of Patent: Jul. 28, 2015

(54) METHOD AND APPARATUS FOR SYNCHRONIZING ASSETS ACROSS DISTRIBUTED SYSTEMS

(75) Inventors: Sudhir Aggarwal, Tallahassee, FL (US); Hemant Banavar, Redmond, WA (US); Sarit Mukherjee, Morganville, NJ (US); Sampath Rangarajan, Bridgewater, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2787 days.

(21) Appl. No.: 11/539,976

(22) Filed: Oct. 10, 2006

(65) Prior Publication Data

US 2007/0198658 A1 Aug. 23, 2007

Related U.S. Application Data

(60) Provisional application No. 60/774,570, filed on Feb. 17, 2006.

(51) Int. Cl.
  *G06F 15/16* (2006.01)
  *A63F 13/30* (2014.01)
  *H04L 29/08* (2006.01)

(52) U.S. Cl.
  CPC ............ *A63F 13/12* (2013.01); *H04L 67/1095* (2013.01); *A63F 2300/534* (2013.01); *A63F 2300/646* (2013.01)

(58) Field of Classification Search
  USPC ......................................................... 709/219
  See application file for complete search history.

(56) References Cited

U.S. PATENT DOCUMENTS

| 6,042,477 | A  | * | 3/2000 | Addink ............................. 463/42 |
| 6,308,565 | B1 | * | 10/2001 | French et al. ............... 73/379.04 |
| 6,745,236 | B1 | * | 6/2004 | Hawkins et al. .............. 709/218 |
| 7,447,226 | B2 | * | 11/2008 | Bivens et al. .................. 370/429 |
| 2002/0183961 | A1 | * | 12/2002 | French et al. .................. 702/150 |
| 2005/0094666 | A1 | * | 5/2005 | Biyens et al. .................. 370/473 |
| 2005/0233810 | A1 | * | 10/2005 | Chiang ........................... 463/42 |
| 2007/0060359 | A1 | * | 3/2007 | Smith ............................ 463/42 |

OTHER PUBLICATIONS

S. Aggarwal et al., "Accuracy in Dead-Reckoning Based Distributed Multi-Player Games," SIGCOMM '04 Workshops, Aug. 30 & Sep. 3, 2004, Portland, OR, pp. 161-165.

* cited by examiner

*Primary Examiner* — Krista Zele
*Assistant Examiner* — Tariq Najee-Ullah
(74) *Attorney, Agent, or Firm* — Wall & Tong, LLP

(57) ABSTRACT

The invention includes a method and apparatus for synchronizing an asset within application space. The method includes receiving asset information comprising an original position of the asset within application space on a sending system and a trajectory of the asset within application space on the sending system, and determining an updated position adapted for placing the asset within application space on a receiving system, wherein the updated position is determined using the original position, the trajectory, and an expected propagation delay from the sending system to the receiving system. The expected propagation delay between the sending and receiving systems is determined by one or more network proxies. The original position and trajectory of the asset may be received in a data structure which may be modified to include the updated position for use by the receiving system in placing the asset within application space on the receiving system.

17 Claims, 7 Drawing Sheets

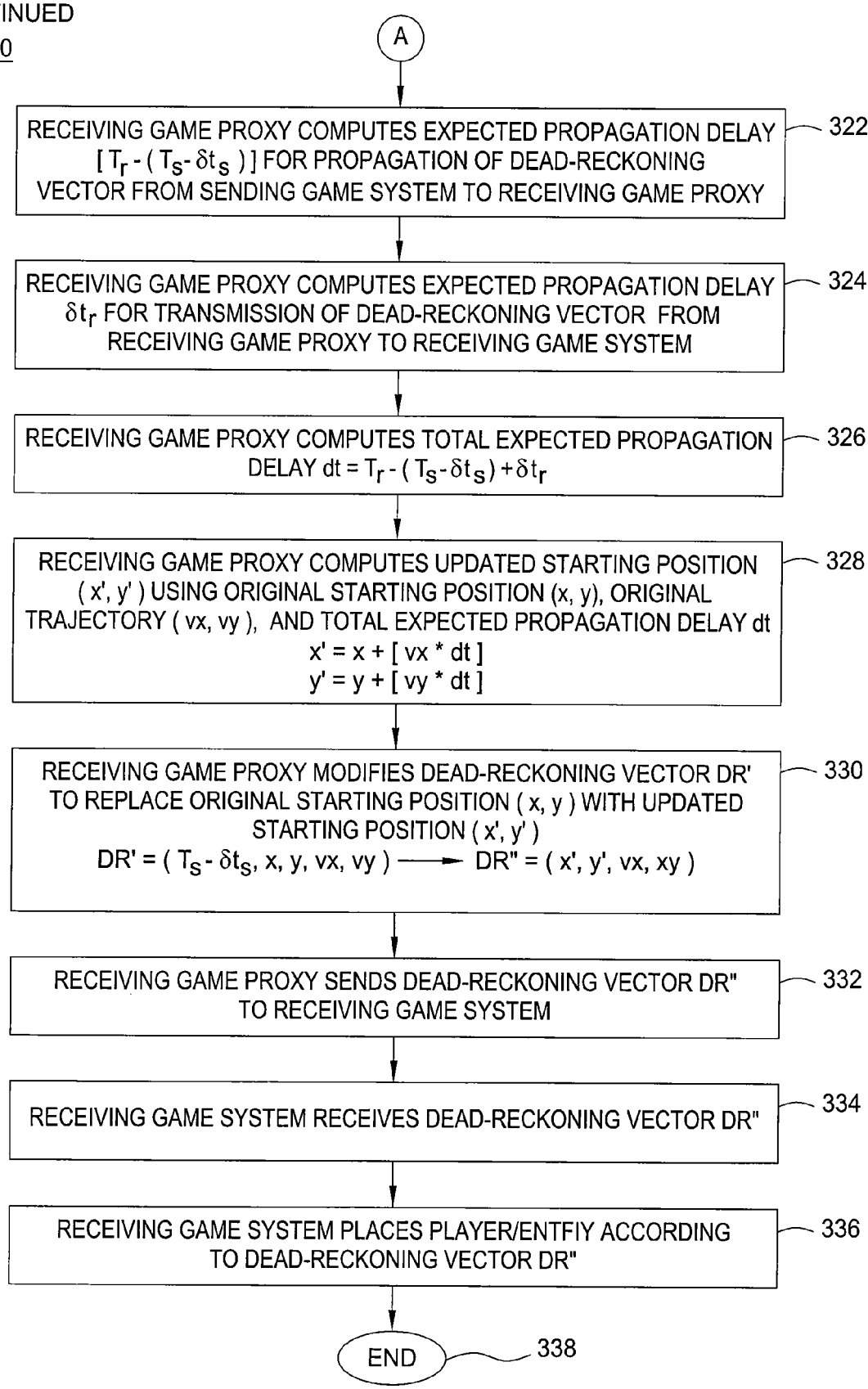

(A)

↓

RECEIVING GAME PROXY COMPUTES EXPECTED PROPAGATION DELAY $[T_r - (T_s - \delta t_s)]$ FOR PROPAGATION OF DEAD-RECKONING VECTOR FROM SENDING GAME SYSTEM TO RECEIVING GAME PROXY — 322

↓

RECEIVING GAME PROXY COMPUTES EXPECTED PROPAGATION DELAY $\delta t_r$ FOR TRANSMISSION OF DEAD-RECKONING VECTOR FROM RECEIVING GAME PROXY TO RECEIVING GAME SYSTEM — 324

↓

RECEIVING GAME PROXY COMPUTES TOTAL EXPECTED PROPAGATION DELAY $dt = T_r - (T_s - \delta t_s) + \delta t_r$ — 326

↓

RECEIVING GAME PROXY COMPUTES UPDATED STARTING POSITION $(x', y')$ USING ORIGINAL STARTING POSITION $(x, y)$, ORIGINAL TRAJECTORY $(vx, vy)$, AND TOTAL EXPECTED PROPAGATION DELAY $dt$
$x' = x + [vx * dt]$
$y' = y + [vy * dt]$ — 328

↓

RECEIVING GAME PROXY MODIFIES DEAD-RECKONING VECTOR DR' TO REPLACE ORIGINAL STARTING POSITION $(x, y)$ WITH UPDATED STARTING POSITION $(x', y')$
$DR' = (T_s - \delta t_s, x, y, vx, vy) \longrightarrow DR'' = (x', y', vx, xy)$ — 330

↓

RECEIVING GAME PROXY SENDS DEAD-RECKONING VECTOR DR" TO RECEIVING GAME SYSTEM — 332

↓

RECEIVING GAME SYSTEM RECEIVES DEAD-RECKONING VECTOR DR" — 334

↓

RECEIVING GAME SYSTEM PLACES PLAYER/ENTFIY ACCORDING TO DEAD-RECKONING VECTOR DR" — 336

↓

( END ) — 338

500

METHOD AND APPARATUS FOR SYNCHRONIZING ASSETS ACROSS DISTRIBUTED SYSTEMS

CROSS-REFERENCE TO RELATED APPLICATION

This application claims priority of commonly owned U.S. Provisional Patent Application Ser. No. 60/774,570 filed on Feb. 17, 2006, which is incorporated by reference herein in its entirety.

FIELD OF THE INVENTION

The invention relates to the field of communication networks and, more specifically, to distributed multiplayer games.

BACKGROUND OF THE INVENTION

In a distributed multiplayer game, end users are often geographically distributed, with each end user using an associated game system. In such games, end users control players and, optionally, associated entities, within the game space. The players/entities may include any virtual objects existing within the game space. During the course of the game, players/entities move within the game space. The portion of the game space in which each player moves is displayed to the associated end user controlling the player. In most multiplayer games, all players are capable of moving within the game space simultaneously. In order to ensure accurate and fair play, each end user must be able to see a continuously updated position of each player/entity within the portion of the game space occupied by the player controlled by that end user.

Since continuous exchange of information between game systems is almost impossible, a technique known as dead-reckoning is commonly used to exchange player/entity movement information among game systems. Using a technique known as dead-reckoning, each game system sends player/entity position and movement information (with respect to that player, and entities controlled by that player) to every other game system using dead-reckoning vectors. A dead-reckoning vector includes information about the position and movement of a player/entity in the game space on the sending game system. The exchanged dead-reckoning vectors are processed by receiving game systems to render the associated player/entity in the game space on the respective receiving game systems.

In existing game systems (i.e., distributed multiplayer games limited to a small number of players in close proximity), network delay may be assumed to be negligible. Disadvantageously, however, even if network delay is negligible, due to use of dead-reckoning vectors to project player/entity trajectory, by the time a dead-reckoning vector is received and rendered by a receiving game system, the original trajectory of the player/entity at the sending game system may have already changed. As such, in physical time, there is a deviation at the receiving game system between the real trajectory (denoted as a real path) and the rendered trajectory (denoted as the placed path). This deviation is unavoidable unless every movement for a player/entity is continuously sent to every game system.

In emerging games (i.e., distributed multiplayer games involving a large number of players interacting over large distances using the Internet), network delay is not negligible, thereby resulting in a deviation between the placed path and rendering on the receiving game system of the dead-reckoning vector exported by the sending game system (denoted as an exported path). The trajectory of a player/entity that a sending game system expects receiving game systems to follow in physical time may not be followed in physical time due to non-negligible network delay. In other words, placed paths and associated exported paths may deviate in physical time, thereby creating game-playing inaccuracies. This deviation between placed paths and associated exported paths may be denoted as an export error.

In distributed multiplayer games, game playing accuracy is measured according to the game playing experience as observed by end users in terms of accurate rendering of movements of players/entities on distributed game systems (i.e., maximum game playing accuracy is achieved in the absence of network delay). According to such game playing accuracy, in physical time, end users should experience identical movements of players/entities within the game space. In one embodiment, this notion of game playing accuracy may be defined using the following player/entity trajectories: (1) the trajectory of the player/entity at the receiving game system before the dead-reckoning vector is received and (2) the trajectory of the player/entity at the receiving game system after the dead-reckoning vector is received.

An export error associated with movement of the player/entity at the receiving game system before the dead-reckoning vector is received at the receiving game system is denoted as a before export error. An export error associated with movement of the player/entity at the receiving game system after the dead-reckoning vector is received at the receiving game system is denoted as an after export error. Both before export errors and after export errors are due to a deviation between the exported path on the sending game system and the placed path on the receiving game system (i.e., due to network delay in propagating dead-reckoning vectors from sending game systems to receiving game systems). In existing distributed multiplayer games, receiving game systems experience both before export errors and after export errors, thereby resulting in game-playing inaccuracies.

SUMMARY OF THE INVENTION

Various deficiencies in the prior art are addressed through the invention of a method and apparatus for synchronizing an asset within application space. The method includes receiving asset information comprising an original position of the asset within application space on a sending system and a trajectory of the asset within application space on the sending system, and determining an updated position adapted for placing the asset within application space on a receiving system, wherein the updated position is determined using the original position, the trajectory, and an expected propagation delay from the sending system to the receiving system. The expected propagation delay between the sending and receiving systems is determined by one or more network proxies. The original position and trajectory of the asset may be received in a data structure which may be modified to include the updated position for use by the receiving system in placing the asset within application space on the receiving system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention includes a communication network having one or more proxies adapted for modifying a dead-reckoning vector in a manner for reducing after export error associated with placement of a player/entity on a receiving game system caused by movement of the player/entity on a sending game system during the propagation of the dead-reckoning vector from the sending game system to the receiving game system. For a dead-reckoning vector including original position and trajectory information associated with the player/entity, the dead-reckoning vector is modified by one or more proxies to include updated position information. In one embodiment, updated position information is determined using the original position information, the trajectory information, and a total expected propagation delay from the sending game system to the receiving game system.

Although primarily depicted and described herein with respect to game players and game entities, game players and game entities may be more generally referred herein to as game assets, or, simply, assets. Although primarily depicted and described herein with respect to a specific topology of the proxy-based communication network, proxy-base communication networks used in accordance with the present invention may be implemented using various other topologies. Although primarily depicted and described herein with respect to game spaces having specific properties, the present invention may be utilized for exchanging asset information for game spaces having various other combinations of associated properties.

Figure 1:
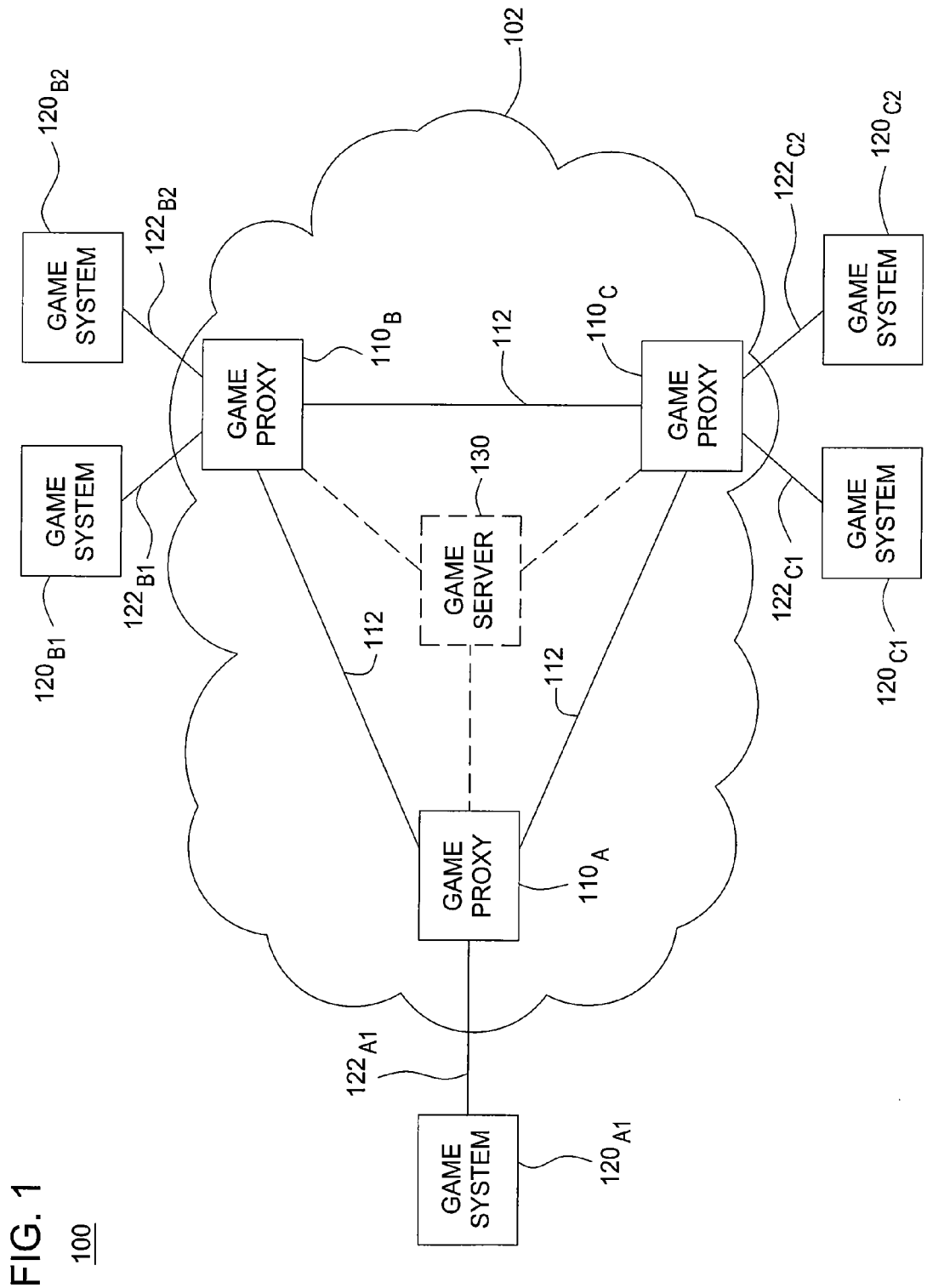
FIG. 1 depicts a high-level block diagram of a communication network including game systems in communication using associated game proxies.

FIG. 1 depicts a high-level block diagram of a communication network including game systems in communication using associated game proxies. Specifically, communication network 100 of FIG. 1 includes a network 102 having a plurality of game proxies $110_A$-$110_C$ (collectively, game proxies 110) in communication using a plurality of network links 112 (collectively, network links 112) and a plurality of game systems $120_{A1}$, $120_{B1}$-$120_{B2}$, and $120_{C1}$-$120_{C2}$ (collectively, game systems 120). The game systems $120_A$, $120_B$, and $120_C$ communicate with network 102 using respective access links $122_A$, $122_B$, and $122_C$, respectively. As depicted in FIG. 1, network 102, network links 112, and access links 122 may be implemented using any packet-based communications technology.

As depicted in FIG. 1, game systems 120 include systems operable for supporting distributed multiplayer games. The game systems 120 include processors, memory, communication modules, and like components for performing various functions. The game systems 120 run game software. The game systems 120 capture information associated with players/entities controlled on the respective game systems 120 (e.g., position and trajectory information adapted for placing the players/entities on other game systems). The game systems 120 establish and maintain network connectivity for use in exchanging asset placement (rendering) information with other game systems 120. The game systems 120 process asset placement information received from other game systems 120 in order to place, within the game space, players/entities controlled within the game space on the other game systems 120.

The game systems 120 include presentation devices (e.g., monitors, speakers, and the like, as well as various combinations thereof) for presenting game information to associated end users. The game information may be presented within the context of the game space (and the view of the game space may vary across game systems according to the portion of the game space in which the end user is operating). The game systems 120 include interaction devices (e.g., joysticks, controllers, keyboards, cameras, and the like, as well as various combinations thereof) for enabling end users to interact with the game, as well as with other end users associated with other game systems 120. For example, game systems 120 may include computers, gaming consoles (e.g., SONY PLAYSTATION, NINTENDO N64, and the like), and the like, as well as various combinations thereof.

As depicted in FIG. 1, each game system 120 operates as a sending game system (for locally controlled players/entities) and a receiving game system (for remotely controlled players/entities). A sending game system 120 generates game information for each player/entity controlled locally within the game space on the sending game system 120. The sending game system 120 sends generated game information to receiving game systems 120 (e.g., to every other game system 120). The receiving game systems 120 process received game information for placing the associated player/entity within the game space on respective game systems 120.

A game space is a virtual environment in which a game is played (i.e., in which graphical characters and associated graphical entities interact). A game space may include a coordinate system (e.g., x-y-z coordinates for three-dimensional game spaces) which may be used to identify positions within the game space (e.g., positions of characters, entities, and the like). The game space may include a global time. The game space, or at least a portion thereof, is displayed to one or more users associated with each game system. As described herein, display of the game space may vary across game systems according to the portion of the game space in which each end user is operating, differences introduced by export errors and other errors, computing capabilities of sending and receiving systems, and the like, as well as various combinations thereof.

Although end users may be considered to be operating within a single game space, due to varying states of the game space across different game systems, at each moment in time, each game system may be displaying a slightly different representation or instance of the game space. The present invention attempts to minimize the differences in representations of the game space displayed on distributed game systems 120. The game systems 120 exchange game information in an effort to provide distributed end users with an identical view of the progression of the game within the game space (i.e., of the current state of each player/entity within the game space). In one embodiment, game systems 120 exchange game information to attempt to synchronize, across game systems 120, positions and movements of game assets within game space.

In one embodiment, exchanged information includes asset information, such as player/entity position information, player/entity trajectory information, and like information associated with respective players/entities, as well as various combinations thereof. The player/entity position information includes an original position of a player/entity (i.e., position of the player/entity within the game space on the sending game system) which, using the present invention, may be adapted and/or replaced during the exchange of the asset information to form/include an updated position of the player/entity (i.e., an updated position of the player/entity adapted for placing the player/entity within the game space on the receiving game system). In one embodiment, game systems 120 may exchange game information with one or more central game servers (e.g., for centrally-controlled game players and entities, and like game components, as well as various combinations thereof).

In one embodiment, asset information is exchanged by game systems 120 using a data structure adapted for conveying the asset information. Within the context of gaming systems, asset information is typically exchanged using a data structure known as a dead-reckoning vector. As described herein, a dead-reckoning vector, which is computed and created by a sending game system, includes information adapted for placing, and optionally, moving, a player/entity within the game space on a receiving game system. Although primarily depicted and described herein with respect to using dead-reckoning vectors to exchange asset information, various other data structures may be used within the context of the present invention in order to exchange asset information.

A dead-reckoning vector may include player/entity position information, such as a starting position, one or more intermediate positions, and an ending position of the player/entity within the game space, and the like, as well as various combinations thereof. In one embodiment, position information may be provided using one or more position coordinates (e.g., x and y coordinates in a two-dimensional game space). A dead-reckoning vector may include player/entity trajectory information, which may include velocity information, acceleration information, and the like, as well as various combinations thereof. In one embodiment, trajectory information may be provided using one or more trajectory components (e.g., velocity vx in the direction of the x-axis in a one-dimensional game space). A dead-reckoning vector may specify position and trajectory information using any measure (e.g., using measures of distance, numbers of pixels, and the like, as well as various combinations thereof).

In one embodiment, dead-reckoning vectors may include linear dead-reckoning vectors including starting position and constant velocity information adapted for placing a player/entity within a game space, and for continuing to render the player/entity in a straight-line path within the game space. In one embodiment, in a two-dimensional game space, dead-reckoning vectors may include two-dimensional dead-reckoning vectors (e.g., [x, y, vz, vy]), where x is the placement position along the x axis, y is the placement position along the y axis, vx is the velocity in the direction of the x axis, and vy is the velocity in the direction of the y axis. In one embodiment, in a three-dimensional game space, linear dead-reckoning vectors may include three-dimensional dead-reckoning vectors (e.g., [x, y, z, vz, vy, vz]).

Although primarily described herein with respect to dead-reckoning vectors including position and trajectory information, dead-reckoning vectors may include other information for placing and moving an associated player/entity within a game space at a receiving game system. Although primarily described herein with respect to linear dead-reckoning vectors having starting position information including positional coordinates and trajectory information including velocity information, various other dead-reckoning vectors may be utilized for placing and moving a player/entity within a game space at a receiving game system, and continuing to move the player/entity within the game space at the receiving game system until the next dead-reckoning vector is received at the receiving game system.

In one embodiment, dead-reckoning vectors exchanged by game systems may include quadriatic dead-reckoning vectors including acceleration information. In one embodiment, dead-reckoning vectors exchanged by game systems may include cubic spline dead-reckoning vectors including starting and ending position information and starting and ending velocity information. For purposes of clarity, the present invention is primarily described herein with respect to linear two-dimensional dead-reckoning vectors and linear three-dimensional dead-reckoning vectors having starting position information and velocity information.

In such embodiments, upon receiving a dead-reckoning vector for a player/entity, receiving game systems place the player/entity within the game space using the dead-reckoning vector. In one such embodiment, for a dead-reckoning vector including starting position information (e.g., x, y coordinates) and trajectory information (e.g., vx, vy, velocities associated with the x, y coordinates, respectively), receiving game systems process starting position information to project the player/entity within the game space and process trajectory information for continuously rendering the player/entity along a path within the game space. The receiving game systems render the player/entity along the specified trajectory within the game space until another dead-reckoning vector is received for the player/entity.

As receiving game systems receive dead-reckoning vectors from sending game systems, receiving game systems place and render the associated players/entities using the respective dead-reckoning vectors until another dead-reckoning vector is received for the player/entity. In other words, a current dead-reckoning vector is used to predict the position and trajectory of the player/entity until an updated dead-reckoning vector is received. An updated dead-reckoning vector is typically sent in response to a change in the path of the previous dead-reckoning vector (e.g., in terms of distance in the x-y-z plane). An updated dead-reckoning vector may be sent periodically, in response to a determination that the change in the path satisfies a threshold, and the like, as well as various combinations thereof.

As depicted in FIG. 1, game systems 120 associate with game proxies 110 for exchanging gaming information. As depicted in FIG. 1, game system 120$_{A1}$ associates with game proxy 110$_A$ using an access link 122$_{A1}$, game systems 120$_{B1}$ and 120$_{B2}$ associate with game proxy 110$_B$ using respective access links 122$_{B1}$ and 122$_{B2}$, and game systems 120$_{C1}$ and 120$_{C2}$ associate with game proxy 110$_C$ using respective access links 122$_{C1}$ and 122$_{C2}$. The access links 122$_A$-122$_C$ are collectively denoted as access links 122. Although depicted as associating with one game proxy 110, in one embodiment, at least a portion of game systems 120 may associate with multiple game proxies 1 10.

As depicted in FIG. 1, game proxies 110 include systems adapted for supporting exchanging of game information between game systems 120. The game proxies 110 receive, process, and transmit dead-reckoning vectors in a manner for synchronizing placement and movement of players/entities on game systems 120. In one embodiment, game proxies 110 maintain respective clocks. In one embodiment, game proxy clocks may be synchronized. In one such embodiment, game proxy clocks may be synchronized according to a common time frame (denoted as global time). In one embodiment, game proxies 110 may periodically ping associated game systems 120 to determine respective round-trip delays (and estimate, thereby, one-way delays) between game proxies 110, between game proxies 110 and game systems 120, and between game systems 120.

As depicted in FIG. 1, in one embodiment, network 102 optionally includes a game server 130 in communication with game proxies 110 using a plurality of communication links 132. In one embodiment, game server 130 communicates with at least a portion of game proxies 110 for controlling game proxies 110, exchanging game-related information with game proxies 110, and performing like functions, as well as various combinations thereof. In one such embodiment, game server 130 communicates with at least a portion of game proxies for exchanging game information with game systems 120 (e.g., information controlling placement and, optionally, movement of game-controlled players/entities, game timing information, game software updates, and the like, as well as various combinations thereof).

In distributed multiplayer games, game playing accuracy may be measured according to the relative extent to which game players experience the game space on distributed game systems (i.e., maximum game playing accuracy is achieved in the absence of network delay). According to such game playing accuracy, in physical time, players should experience identical movements of players/entities within the game space. In one embodiment, this notion of game playing accuracy may be defined using the following player/entity trajectories: (1) the trajectory of the player/entity at the receiving game system before the dead-reckoning vector is received and (2) the trajectory of the player/entity at the receiving game system after the dead-reckoning vector is received.

As described herein, placed paths and associated exported paths may deviate in physical time. This deviation between a placed and exported path may be denoted as an export error. As described herein, an export error associated with the trajectory of the player/entity at the receiving game system before the dead-reckoning vector is received is denoted as a before export error and an export error associated with the trajectory of the player/entity at the receiving game system after the dead-reckoning vector is received is denoted as an after export error. In existing distributed multiplayer games, receiving game systems experience both before export errors. The before export errors and after export errors may be better understood with respect to FIG. 2.

Figure 2:
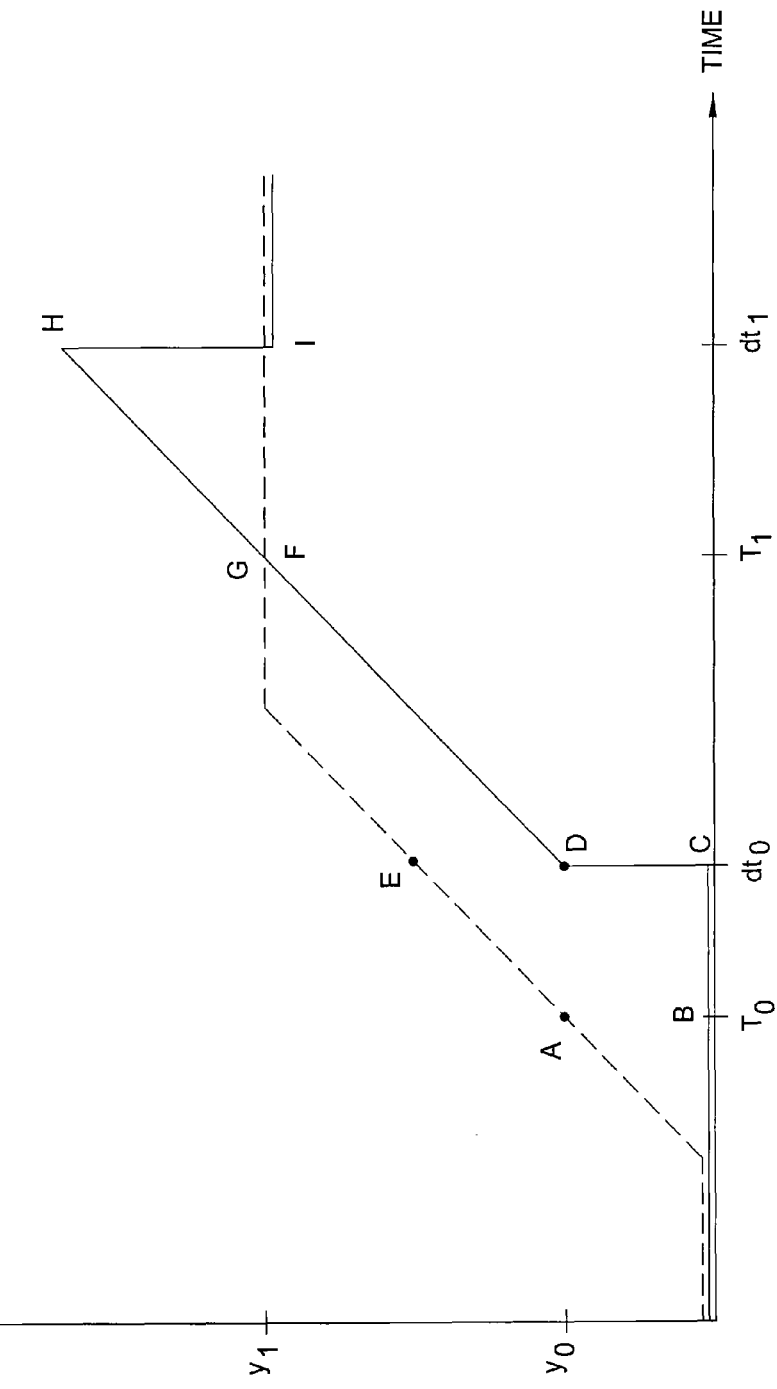
FIG. 2 depicts a model illustrating movement of a game asset within a game space on a sending game system and a receiving game system.

FIG. 2 depicts a model illustrating movement of a game asset within a game space on a sending game system and a receiving game system. The model 200 of FIG. 2 illustrates exported paths and placed paths associated with the sending game system and receiving game system, as well as various after export errors resulting from exchanging of dead-reckoning vectors between the sending and receiving game systems. As depicted in FIG. 2, model 200 includes a time axis (x-axis) and a motion axis (y-axis). For purposes of clarity, the time axis represents physical time with respect to a clock maintained by the sending game system. For purposes of clarity, model 200 of FIG. 2 is depicted and described with respect to a one-dimensional game space.

As depicted in FIG. 2, at a time $T_0$, a dead-reckoning vector $DR_0=(T_0, y_0, vy_0)$ is computed for a player by the sending game system. At time $T_0$, on the sending game system, the player/entity is located at position $(y_0)$ (illustratively, point A). At time $T_0$, on the receiving game system, due to the trajectory of the player/entity during the time prior to $T_0$, the player/entity is located at the coordinates of point B. The dead-reckoning vector $DR_0$ is sent from the sending game system to the receiving game system. The dead-reckoning vector $DR_0$ is received at the receiving game system after a delay $dt_0$. At time $T_0+dt_0$, the player/entity is located at the coordinates of point C on the receiving game system.

As depicted in FIG. 2, the receiving game system moves the player/entity from point C to starting location $(y_0)$ as specified by dead-reckoning vector $DR_0$ (illustratively, point D). Since the player/entity continues to move within the game space on the sending game system during delay $dt_0$, without adaptation of the starting location as defined in the present invention, the starting location $(y_0)$ at which the player/entity is placed on receiving game system at time $T_0+dt_0$ (illustratively, point D) is different from the current location of the player/entity on the sending game system at time $T_0+dt_0$ (illustratively, point E).

As depicted in FIG. 2, coordinates of points A and D are identical, however, since time is measured along the x-axis, the player/entity is located at the coordinates of point A on the sending game system at time $T_0$ while the player/entity is not placed at the identical coordinates of point D on the receiving game system until time $T_0+dt_0$. At the physical time at which the player/entity is located at the coordinates of point D on the receiving game system $(T_0+dt_0)$, the trajectory of the player/entity on the sending game system is following the same path, however the player/entity is located at different coordinates on the sending game system (illustratively, point E). Since the player/entity was located at the coordinates of point A $(y_0)$ at time $T_0$ on the sending game system, and only at later time $T_0+dt_0$ is the player/entity placed at the same coordinate position D at the receiving game system, point E is ahead in the trajectory.

As depicted in FIG. 2, at a time $T_1$, an updated dead-reckoning vector $DR_1=(T_1, y_1, vy_1)$ is computed for the player/entity by the sending game system. At time $T_1$, on the sending game system, the player/entity is located at position $(y_1)$ (illustratively, point F). At time $T_1$, on the receiving game system, due to the trajectory of the player/entity according to dead-reckoning vector $DR_0$ during the time from $T_0$ to $T_1$, the player/entity is located at the coordinates of point G (which in this example happens to be the same as point F). The dead-reckoning vector $DR_1$ is sent from the sending game system to the receiving game system. The dead-reckoning vector $DR_1$ is received at the receiving game system after a delay $dt_1$. At time $T_1+dt_1$, the player/entity is located at the coordinates of point H on the receiving game system.

As depicted in FIG. 2, the receiving game system moves the player/entity from point H to starting location $(y_1)$ as specified by dead-reckoning vector $DR_1$ (illustratively, point I). Since the player/entity continues to move within the game space on the sending game system during delay $dt_1$, without adaptation of the starting location as defined in the present invention, the starting location $(y_1)$ at which the player/entity is placed on receiving game system at time $T_1+dt_1$ (illustratively, point I) is different from the current location of the player/entity on the sending game system at time $T_1+dt_1$ (illustratively, point J).

As depicted in FIG. 2, coordinates of points F and I are identical, however, since time is measured along the x-axis, the player/entity is located at the coordinates of point F on the sending game system at time $T_1$ while the player/entity is not placed at the identical coordinates of point I on the receiving game system until time $T_1+dt_1$. At the physical time at which the player/entity is located at the coordinates of point I on the receiving game system ($T_1+dt_1$), the trajectory of the player/entity on the sending game system is following the same path, however the player/entity of the sending game system is ahead in the trajectory. Since the player/entity was located at the coordinates of point F ($y_1$) at time $T_1$ on the sending game system, and only at later time $T_1+dt_1$ is the player/entity placed at the same coordinate position at the receiving game system, point F is ahead in the trajectory.

In a distributed multiplayer game without the present invention (which cannot account for player/entity movements on the sending game system while an associated dead-reckoning vector is in transit to the receiving game system), the receiving game system moves the player/entity from the location at the time at which the dead-reckoning vector is received to the location specified in the dead-reckoning vector (i.e., the position of the player/entity on the sending game system at the time at which the dead-reckoning vector is computed). Since the player/entity continues to move within the game space on the sending game system during propagation of the dead-reckoning vector from the sending game system to the receiving game systems, without adaptation of the starting location as defined by the present invention, the starting location at which the player/entity is placed on receiving game system at the time at which the dead-reckoning vector is received is different from the current location of the player/entity on the sending game system at the time at which the dead-reckoning vector is received.

As depicted in FIG. 2, although the exported path at the sending game system and the placed path at the receiving game system follow the same trajectory, the exported path at the sending game system leads the placed path at the receiving game system. This error between the positions of the player/entity in the game space at the sending game system and the receiving game system due to propagation delay is the after export error. As depicted and described with respect to FIG. 3 and 4, after export error may be significantly reduced by adapting an original position exported by a sending game system, using the trajectory information and an expected propagation delay from the sending game system to the receiving game system, to form thereby an updated position adapted for use by the receiving game system.

Figure 3:
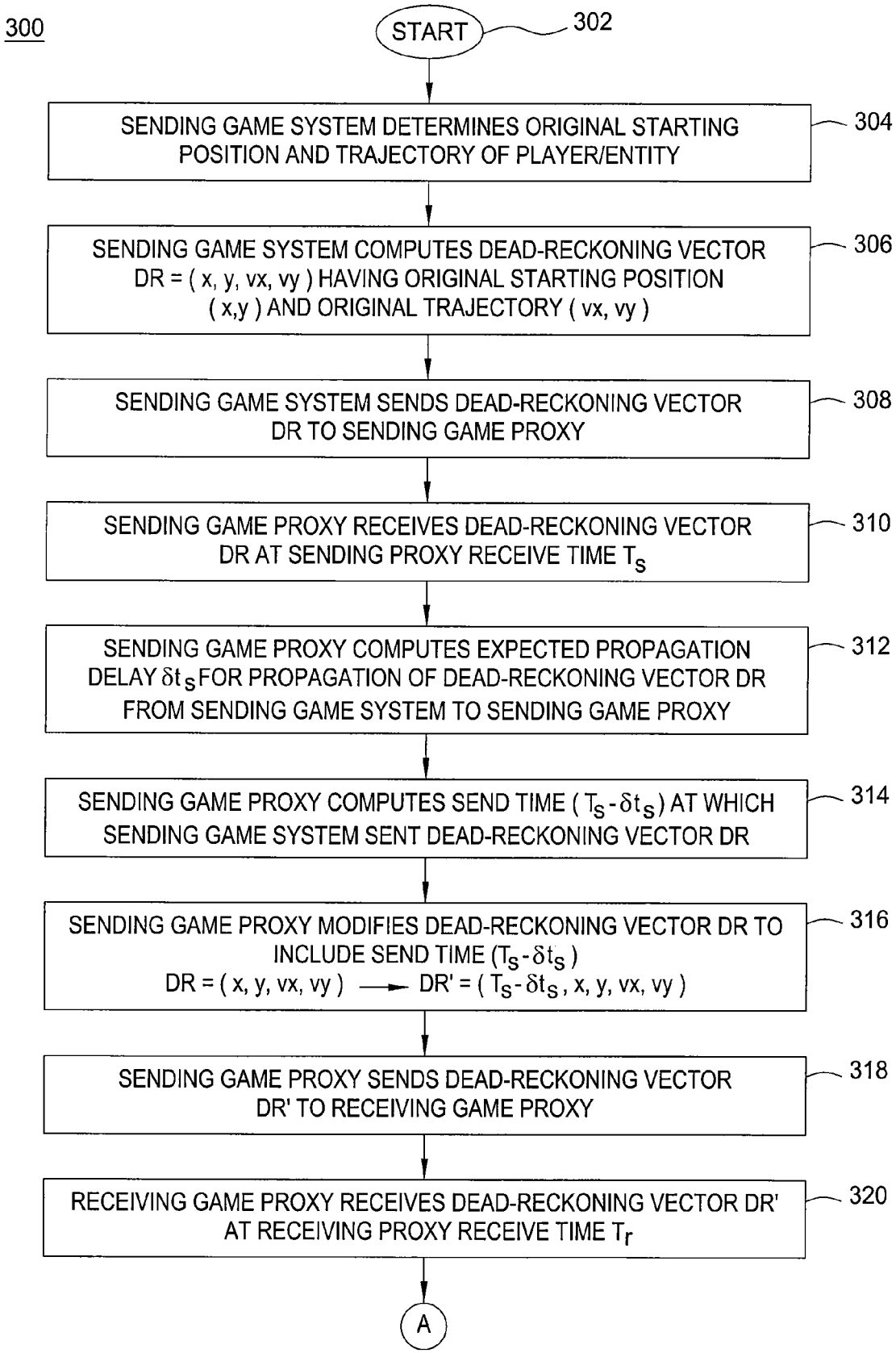
FIG. 3 depicts a method according to one embodiment of the present invention.

FIG. 3 depicts a method according to one embodiment of the present invention. Specifically, method 300 includes a method for synchronizing placement of a player/entity within a game space of a sending game system and a receiving game system using a sending game proxy and a receiving game proxy. Although depicted and described with respect to one sending game system and one receiving game system, method 300 of FIG. 3 may be performed for each dead-reckoning vector associated with each player/entity generated by each sending game system and provided to each of a plurality of receiving game systems. Although depicted and described as being performed serially, at least a portion of the steps of method 300 of FIG. 3 may be performed contemporaneously, or in a different order depicted in FIG. 3. The method 300 begins at step 302 and proceeds to step 304.

At step 304, a sending game system (illustratively, game system $120_{A1}$) determines an original starting position of a player/entity and a trajectory of the game player/entity. At step 306, the sending game system computes a dead-reckoning vector including the original starting position and trajectory of the player/entity (denoted as DR=[x, y, vx, vy] including original starting position coordinates [x, y] and original trajectory velocity components [vx, vy]). At step 308, the sending game system sends dead-reckoning vector DR to a sending game proxy (illustratively, game proxy $110_A$). At step 310, the sending game proxy receives dead-reckoning vector DR from the sending game system at a sending proxy receive time (denoted as $T_s$). The sending proxy receive time $T_s$ may be a global time (i.e., determined, at least partially, according to a global clock).

At step 312, the sending game proxy computes an expected propagation delay $\delta t_s$ for propagation of dead-reckoning vector DR from the sending game system to the sending game proxy. In one embodiment, the sending game proxy computes expected propagation delay $\delta t_s$ using a round-trip delay between the sending game proxy and the sending game system. The round trip delay between the sending game proxy and the sending game system may be computed using any of a plurality of methods. In one embodiment, for example, the round trip delay may be determined by the sending game proxy by pinging the sending game system. In one embodiment, for example, the round trip delay may be determined by the sending game system by pinging the sending game proxy (and including the round trip delay within dead-reckoning vector DR sent to the sending game proxy).

At step 314, the sending game proxy computes a send time ($T_s-\delta t_s$) at which the sending game system sent dead-reckoning vector DR to the sending game proxy. The send time ($T_s-\delta t_s$) may be a global time. At step 316, the sending game proxy modifies dead-reckoning vector DR to include send time ($T_s-\delta t_s$) (i.e., DR=[x, y, vx, vy]→DR'=[$T_s-\delta t_s$, x, y, vx, vy]). At step 318, the sending game proxy sends dead-reckoning vector DR' to a receiving game proxy (illustratively, game proxy $110_C$). At step 320, the receiving game proxy receives dead-reckoning vector DR' at receiving proxy receive time (denoted as $T_r$). The receiving proxy receive time $T_r$ may be a global time. At step 322, the receiving game proxy computes an expected propagation delay [$T_r-(T_s-\delta t_s)$] for propagation of the dead-reckoning vector (DR and modified DR') from the sending game system to the receiving game proxy.

At step 324, the receiving game proxy computes an expected propagation delay $\delta t_r$ for propagation of dead-reckoning vector DR" (a modified version of DR', not yet computed by the receiving game proxy) from the receiving game proxy to the receiving game system. In one embodiment, the receiving game proxy computes the expected propagation delay $\delta t_r$ using a round-trip delay between the receiving game proxy and the receiving game system (e.g., determined by the receiving game proxy by pinging the receiving game system, or using other methods, as described herein). At step 326, the receiving game proxy computes a total expected propagation delay dt=[$T_r-(T_s-\delta t_s)+\delta t_r$] for propagation of the dead-reckoning vector (i.e., in different forms: DR, DR', DR") from the sending game system to the receiving game system.

At step 328, the receiving game proxy computes an updated starting position (x', y') using the original starting position (x, y) and the total expected propagation delay dt. The updated starting position is computed as follows: x'=x+[vx*dt] and y'=y+[vy*dt]. At step 330, the receiving game proxy modifies dead-reckoning vector DR' to include the updated starting position (x', y'). At step 332, the receiving game proxy sends dead-reckoning vector DR" to the receiving game system (illustratively, game system $120_{C2}$). At step 334, the receiving game system receives dead-reckoning vector DR". At step 336, the receiving game system places the player/entity according to dead-reckoning vector DR". At step 338, method 300 ends.

In one embodiment, the receiving game proxy may add the updated starting position (x', y') to DR' (e.g., DR'=[$T_s-\delta t_s$, x, y, vx, vy]→DR"=[$T_s-\delta t_s$, x, y, vx, vy, x', y'], DR'=[$T_s-\delta t_s$, x, y, vx, vy]→DR"=[$T_s-\delta t_s$, x, y, x', y', vx, vy], and the like). In one embodiment, the receiving game proxy may replace the original starting position (x, y) (and, optionally, at least a portion of other information added to the dead-reckoning vector for use in computing the updated starting position) with the updated starting position (x', y') (i.e., DR'=[$T_s$–δ$t_s$, x, y, vx, vy]→DR"=[x', y', vx, vy]). The present invention is not limited by the data structure in which the updated starting position is conveyed to the receiving game system.

Although depicted and described with respect to embodiments in which various send and receive times, as well as expected propagation delays, are determined, the present invention may be implemented using various other combinations of send and receive times as well as expected propagation delays. In one embodiment, the total expected propagation delay from the sending system to the receiving system may be determined by a more generic method such as determining a first expected propagation delay from the sending game system to the sending game proxy, determining a second expected propagation delay from the sending game proxy to the receiving game proxy determining a third expected propagation delay from the receiving game proxy to the receiving game system, and determining the total expected propagation delay using the first, second, and third expected propagation delays.

As depicted and described with respect to FIG. 3, in one embodiment, a sending game system and a receiving game system associate with sending game proxy and a receiving game proxy, respectively. In this embodiment, in order to compute total expected propagation delay dt, expected proxy propagation delay ($T_s$–$T_r$) for propagation of a dead-reckoning vector from the sending game proxy to the receiving game proxy is required. In one embodiment, in which a sending game system and a receiving game system associate with a common game proxy, at least a portion of method 300 (including determination of expected proxy propagation delay ($T_s$–$T_r$)) may be omitted. An exemplary embodiment, in which a sending game system and a receiving game system associate with a single, common game proxy, is depicted and described herein with respect to FIG. 4.

Figure 4:
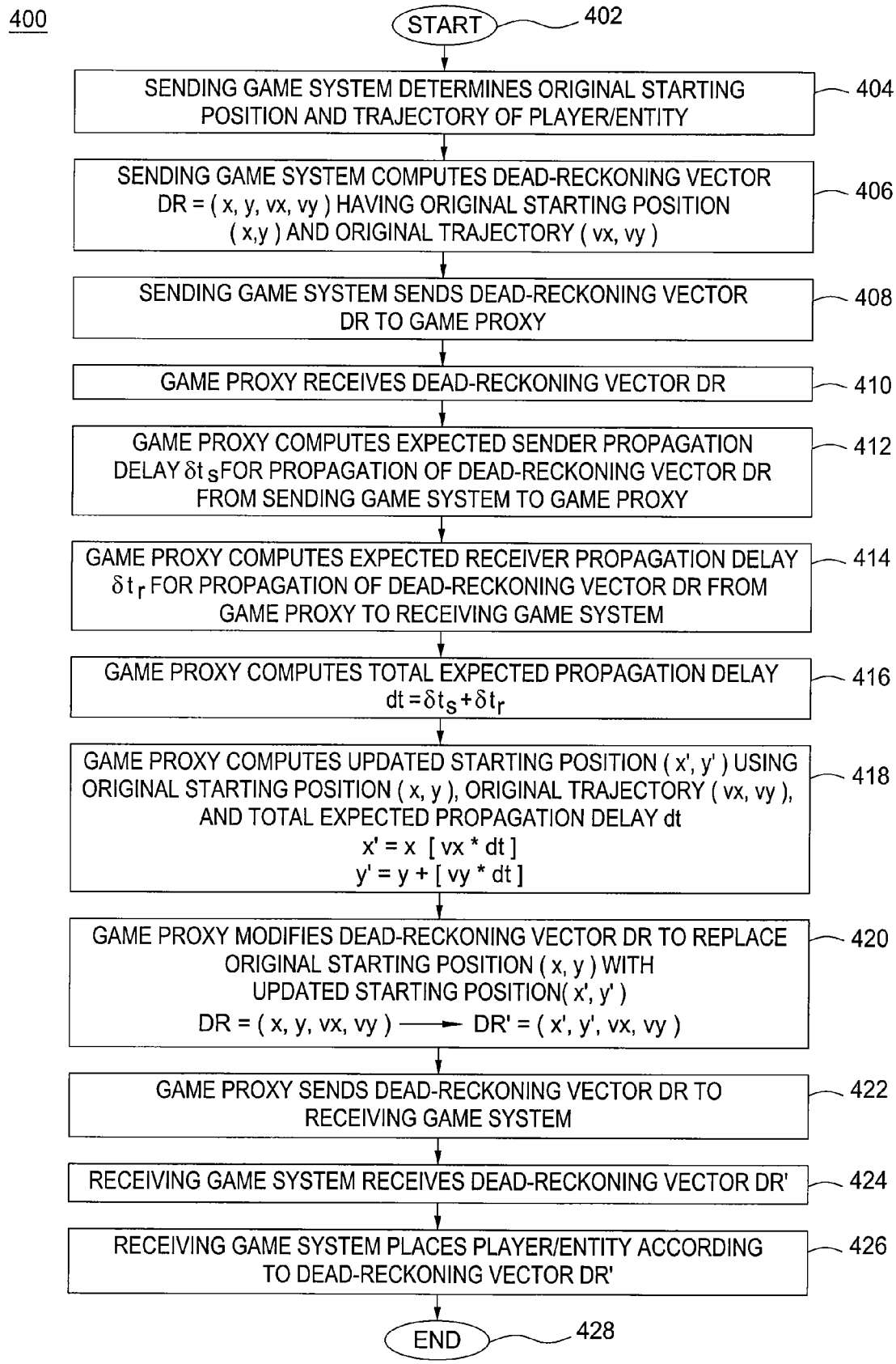
FIG. 4 depicts a method according to one embodiment of the present invention.

FIG. 4 depicts a method according to one embodiment of the present invention. Specifically, method 400 includes a method for synchronizing placement of a player/entity within a game space of a sending game system and a receiving game system using a single game proxy. Although depicted and described with respect to one sending game system and one receiving game system, method 400 of FIG. 4 may be performed for each dead-reckoning vector associated with each player/entity generated by each sending game system and provided to each of a plurality of receiving game systems. Although depicted and described as being performed serially, at least a portion of the steps of method 400 of FIG. 4 may be performed contemporaneously, or in a different order depicted in FIG. 4. The method 400 begins at step 402 and proceeds to step 404.

At step 404, a sending game system (illustratively, game system $120_{A1}$) determines an original starting position of a player/entity and a trajectory of the game player/entity. At step 406, the sending game system computes a dead-reckoning vector including the original starting position and trajectory of the player/entity (denoted as DR=[x, y, vx, vy] including original starting position coordinates [x, y] and original trajectory velocity components [vx, vy]). At step 408, the sending game system sends dead-reckoning vector DR to a game proxy (illustratively, game proxy $110_B$). At step 410, the game proxy receives dead-reckoning vector DR.

At step 412, the game proxy computes an expected sender propagation delay δ $t_s$ for propagation of dead-reckoning vector DR from the sending game system to the game proxy. At step 414, the game proxy computes an expected receiver propagation delay δ $t_r$ for propagation of dead-reckoning vector DR' (a modified version of DR, not yet computed by the game proxy) from the game proxy to the receiving game system. At step 416, the receiving game proxy computes a total expected propagation delay dt=δ $t_s$+δ $t_r$ for propagation of the dead-reckoning vector (DR, DR') from the sending game system to the receiving game system.

At step 418, the game proxy computes an updated starting position (x', y') using the original starting position (x, y) and the total expected propagation delay dt. The updated starting position is computed as follows: x'=x+[vx*dt] and y'=y+[vy*dt]. At step 420, the game proxy modifies dead-reckoning vector DR to include the updated starting position (x', y'). As described herein with respect to FIG. 3, the game proxy may add the updated starting position to the dead-reckoning vector, replace at least a portion of the dead-reckoning vector with the updated starting position, and the like (e.g., DR'=[$T_s$–δ$t_s$, x, y, vx, vy]→DR"=[x', y', vx, vy]). At step 422, the game proxy sends dead-reckoning vector DR' to the receiving game system (illustratively, game system $120_{B2}$). At step 424, the receiving game system receives dead-reckoning vector DR'. At step 426, the receiving game system places the player/entity according to dead-reckoning vector DR'. At step 428, method 400 ends.

Although primarily depicted and described herein with respect to embodiments in which either two game proxies (as depicted and described with respect to FIG. 3) or one game proxy (as depicted and described with respect to FIG. 4) are used, in other embodiments, one or more additional game proxies may be used for exchanging dead-reckoning vectors, as well as determining various send and receive times, as well as expected propagation delays, in accordance with the present invention. In other words, the present invention is not limited by the number of game proxies disposed in the communication path between a sending game system and a receiving game system.

Although omitted for purposes of clarity, in one embodiment, in addition to modifying original starting position information using a total expected propagation delay between the sending and receiving game systems, the original starting position information may be modified using a total processing delay (denoted as dp) which is indicative of the delay due to processing performed by one or more game proxies which forward dead-reckoning vectors between the sending and receiving game systems (e.g., delay introduced by the receiving game proxy during computation of the total expected propagation delay dt. In one such embodiment, the updated starting position is computed as follows: x'=x+[vx*(dt+dp)] and y'=y+[vy*(dt+dp)]. In other embodiments, other delays may be accounted for in determining the updated starting position.

Although primarily referred to herein as a starting position, within the context of a sending game system, a starting position may be alternatively referred to as a snapshot position (i.e., position within the game space at which a game asset is located when the sending game system computes a dead-reckoning vector for the game asset for transmission to the receiving game system for use in placing and moving the game asset within the game space on the receiving game system). Although primarily referred to herein as a starting position, within the context of a receiving game system, a starting position may be alternatively referred to as a placement position (i.e., position within the game space at which a game asset is placed and from which the corresponding trajectory information is applied to effect movement of the game asset within the game space). A starting position may alternatively be referred to more generally herein as a position, although, as described herein, position information may include starting, intermediate, and ending positions.

Figure 5:
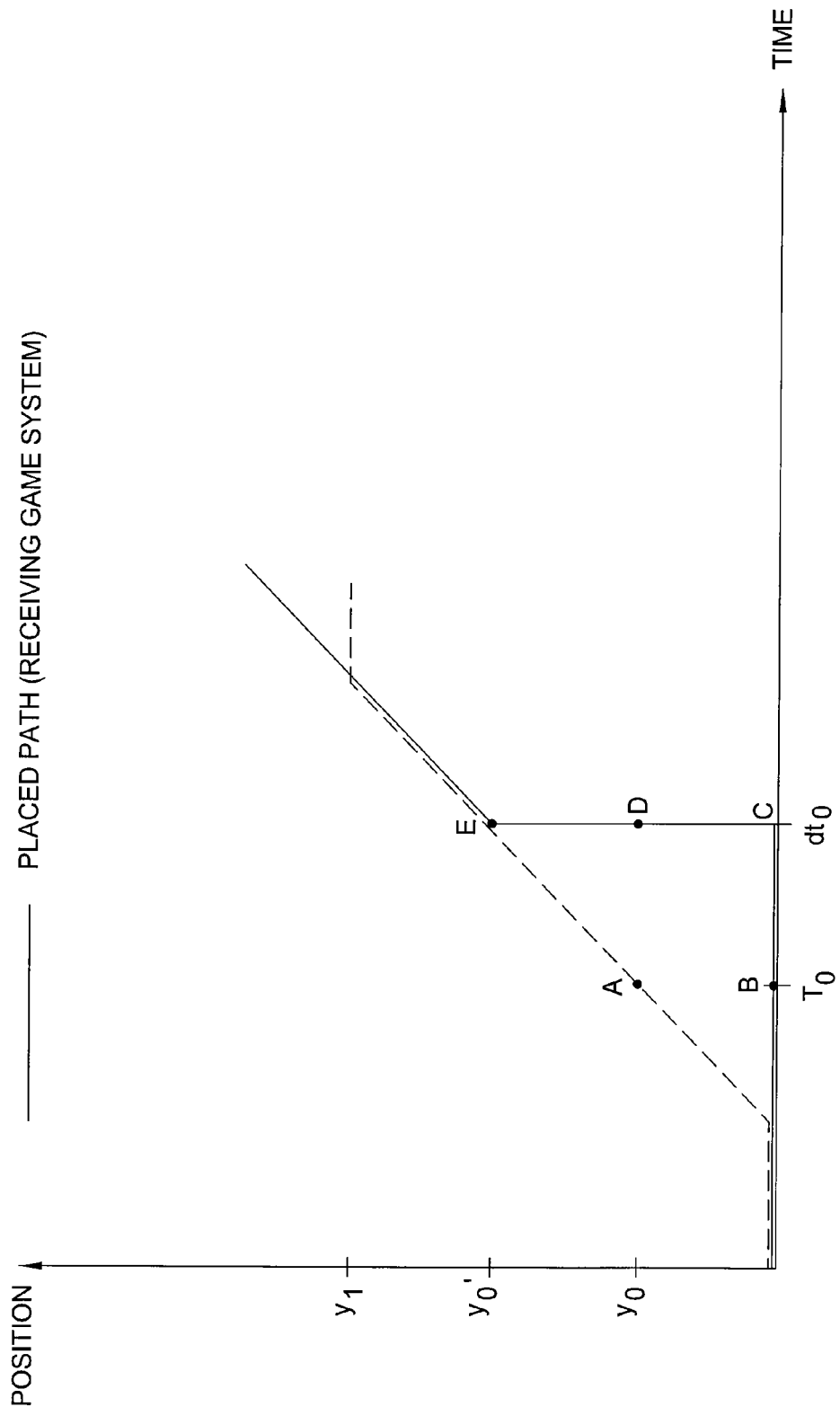
FIG. 5 depicts a model illustrating movement of a game asset within a game space on a sending game system and a receiving game system.

FIG. 5 depicts a model illustrating movement of a game asset within a game space on a sending game system and a receiving game system. The model 500 of FIG. 5 illustrates exported paths and placed paths associated with the sending game system and receiving game system. As depicted in FIG. 5, model 500 is similar to model 200 of FIG. 2. The exported path of model 500 is identical to the exported path of model 200, however, due to compensation for the after export error, the placed path of model 500 more closely tracks the exported path of model 500 than the placed path of model 200 tracks the exported path of model 200 (i.e., the present invention eliminates the after export error due to the delay in transmitting the exported path from the sending game system to the receiving game system).

As depicted in FIG. 5, at time $dt_0$ at which the receiving game system receives the dead-reckoning vector from the sending game system, rather than moving the player/entity from point C to an original starting position ($y_0$) sent by the sending game system in the original dead-reckoning vector (illustratively, point D), the receiving game system moves the player/entity to an updated starting position ($y_0'$) received in a modified dead-reckoning vector (modified by one or more game proxies between the sending and receiving game systems in accordance with the present invention). As depicted in FIG. 5, rather than being moved from point C to point D (which lags the exported path at the sending game system), the player/entity is moved from point C to point E (such that the placed path at the receiving game system overlaps the exported path at the sending game system). The present invention has eliminated after export error previous experienced by the receiving game system (as seen in model 200 of FIG. 2).

The present invention may be better understood with respect to the following example which is described within the context of the proxy-based communication network depicted and described herein with respect to FIG. 1. For purposes of clarity, the following example is described within the context of embodiment in which both the sending and receiving game systems are associated with a common game proxy. For purposes of clarity in describing the example, a one-dimensional game space is assumed; however, as described herein, the present invention may be used for exchanging asset information and correcting placement of assets in game spaces having more dimensions. In other words, the present invention is in no way limited by the assumptions or teachings of the following example.

As described herein, as dead-reckoning vectors are created by game systems 120 and exchanged between game systems 120 using game proxies 110, game proxies 110 add time data to the dead-reckoning vectors. The game proxies 110 maintain clocks which are synchronized across each of the game systems 110 in order to maintain a uniform time reference (sometimes referred to herein as "global time"). The game proxies $110_A$-$110_C$ periodically transmit timing data to respective game systems $120_A$-$120_C$ in order to determine round-trip propagation delay (sometimes referred to herein as "pinging" the game systems 120). In this manner, game proxies 110 can continually update the appropriate delay values to account for variability of Internet transmission delays and, further, eliminates the need for game systems 120 to maintain synchronized clocks.

For the purposes of the present example, assume that game system $120_{B1}$ generates a dead-reckoning vector DR for an asset, where the dead-reckoning vector is intended to be delivered to game system $120_{B2}$. Further assume that the original starting position (x) on game system $120_{B1}$ is x=+1.000 cm and the original trajectory (vx) on game system $120_{B1}$ is vx=+1.000 cm/s. The game system $120_{B1}$ transmits the generated dead-reckoning vector to associated game proxy $110_B$. The game proxy $110_B$ receives the dead-reckoning vector DR=[+1.000 cm, +1.000 cm/s] at global time $t_0$ (referred to herein as sending proxy receive time $T_s$).

In continuation of the present example, assume that one-way propagation delay between game system $120_{B1}$ and game proxy $110_B$ (referred to herein as expected sender propagation delay $\delta t_s$) has been determined to be 0.12 seconds. The game proxy $110_B$ computes a global time at which the dead-reckoning vector DR was transmitted by game system $120_{B1}$ (referred to herein as send time ($T_s - \delta t_s$)) as ($t_0 - 0.12$), and attaches send time ($t_0 - 0.12$) to dead-reckoning vector DR. Further assume that one-way propagation delay between game system $120_{B1}$ and game proxy $110_B$ (referred to herein as expected receiver propagation delay $\delta t_r$) has been determined to be 0.11 seconds.

As described herein, in some embodiments, it may also be desirable to consider the computation/processing delay within game proxy $110_B$ (though, in some cases, the computation/processing delay may be so small as to be considered negligible). For purposes of illustration, assume that, for the present example, internal computation/processing delay associated with game proxy $110_B$ (which may be denoted by $\delta t_p$) is 0.02 seconds. In embodiments in which a dead-reckoning vector traverses multiple game proxies, the computation/processing delays of each of the respective game proxies may be accounted for in computing the updated starting position of the associated asset.

In continuation of the present example, game proxy 110B computes the updated starting position as follows: x'=x+[vx*dt], where x is the original starting position (+1.000 cm), vx is the original trajectory (+1.000 cm/s), and dt is the total expected propagation delay from game system $110_{B1}$ to game system $110_{B2}$. The total expected propagation delay dt is computed as follows: dt=$\delta t_s$+$\delta t_r$+$\delta t_p$=0.12 seconds+0.11 seconds+0.02 seconds=0.25 seconds. In the present example, the game proxy $110_B$ computes the updated starting position to be x'=x+[vx*dt]=+1.000 cm+[+1.000 cm/s*0.25 seconds]= +1.250 cm. The game proxy $110_B$ updates dead-reckoning vector DR to include the updated starting position and transmits the updated dead-reckoning vector DR to game system $120_{B2}$ for use in rendering the associated asset within the game space.

Figure 6:
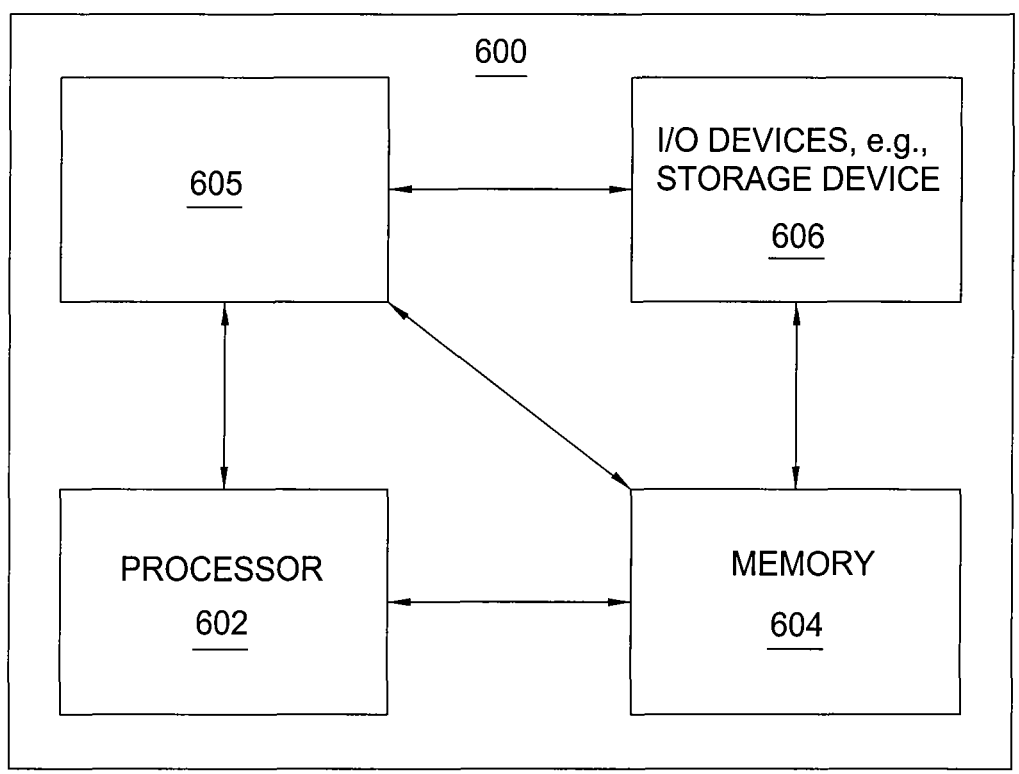
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a dead-reckoning vector control module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present dead-reckoning vector control process 605 can be loaded into memory 604 and executed by processor 602 to implement the functions as discussed above. As such, dead-reckoning vector control process 605 (including associated data structures) of the present invention can be stored on a computer readable medium or carrier, e.g., RAM memory, magnetic or optical drive or diskette and the like.

Although primarily depicted and described herein with respect to synchronization of game assets within a game space, the present invention may be used for synchronizing various other application assets within various other application spaces. The game space described herein merely includes one example of an application space, which may more generally include any virtual environment in which any application (gaming or non-gaming) may operate. In other words, the present invention is not intended to be limited to synchronization of game assets in distributed multiplayer games, but, rather, may be applied to various other non-gaming applications requiring synchronization of assets, objects, and other information which may move within an application space across a plurality of distributed systems.

Although primarily depicted and described herein with respect to a specific network configuration, the present invention may be implemented using various other network configurations. The present invention may be implemented using various network configurations, elements, functions, protocols, and the like, as well as various combinations thereof. Furthermore, although primarily depicted and described herein with respect to specific data structures (e.g., dead-reckoning vectors) having specific formats and including specific information, the present invention may be implemented using various other data structures having different formats, including different combinations of information adapted for controlling placement and subsequent movement of assets, and the like, as well as various combinations thereof.

Although various embodiments which incorporate the teachings of the present invention have been shown and described in detail herein, those skilled in the art can readily devise many other varied embodiments that still incorporate these teachings.

What is claimed is:

1. A method adapted for synchronizing placement of an asset within application space using a proxy, comprising:
    using a processor for:
        receiving, at the proxy, asset information of a sending system, wherein the asset information of the sending system comprises an original position of the asset within application space on the sending system and a trajectory of the asset within application space on the sending system;
        determining, at the proxy, an updated position adapted for placing the asset within application space on a receiving system, wherein the updated position is determined using the original position of the asset within application space on the sending system, the trajectory of the asset within application space on the sending system, and a total expected propagation delay from the sending system to the receiving system;
        updating, at the proxy, the asset information of the sending system to include the updated position; and
        transmitting the updated asset information from the proxy toward the receiving system, wherein the receiving system is configured to place the asset within application space on the receiving system using the updated asset information.

2. The method of claim 1, wherein the proxy is one of:
    a sending proxy associated with the sending system;
    a receiving proxy associated with the receiving system; or
    a common proxy associated with the sending system and the receiving system.

3. The method of claim 1, wherein the proxy is a receiving proxy associated with the receiving system, wherein determining the total expected propagation delay comprises:
    determining a first expected propagation delay from the sending system to the receiving proxy;
    determining a second expected propagation delay from the receiving proxy to the receiving system; and
    determining the total expected propagation delay using the first expected propagation delay and the second expected propagation delay.

4. The method of claim 3, wherein determining the first expected propagation delay comprises:
    determining a send time at which the sending system transmits the asset information;
    determining a receive time at which the receiving proxy receives the asset information; and
    determining the first expected propagation delay using the send time and the receive time.

5. The method of claim 1, wherein the proxy is a sending proxy associated with the sending system, wherein determining the total expected propagation delay comprises:
    determining a first expected propagation delay from the sending system to the sending proxy;
    determining a second expected propagation delay from the sending proxy to the receiving system; and
    determining the total expected propagation delay using the first expected propagation delay and the second expected propagation delay.

6. The method of claim 5, wherein determining the first expected propagation delay comprises:
    determining a send time at which the sending system transmits the asset information;
    determining a receive time at which the sending proxy receives the asset information; and
    determining the first expected propagation delay using the send time and the receive time.

7. The method of claim 1, wherein the proxy is a proxy associated with the sending system and the receiving system, wherein determining the total expected propagation delay comprises:
    determining a first expected propagation delay from the sending system to the proxy;
    determining a second expected propagation delay from the proxy to the receiving system; and
    determining the total expected propagation delay using the first expected propagation delay and the second expected propagation delay.

8. The method of claim 1, wherein determining the updated position comprises:
    determining, for each of a plurality of original position coordinates of the original position, a position increment value, wherein each position increment value is determined by multiplying a trajectory component of the trajectory and the total expected propagation delay, wherein the trajectory component is associated with the original position coordinate; and
    determining, for each of the plurality of original position coordinates, an updated position coordinate, wherein each updated position coordinate is determined by adding the respective position increment value associated with the original position coordinate to that original position coordinate.

9. An apparatus for synchronizing placement of an asset within application space, comprising:
a processor configured to:
receive, at the proxy, asset information of a sending system, wherein the asset information of the sending system comprises an original position of the asset within application space on the sending system and a trajectory of the asset within application space on the sending system;
determine, at the proxy, an updated position adapted for placing the asset within application space on a receiving system, wherein the updated position is determined using the original position of the asset within application space on the sending system, the trajectory of the asset within application space on the sending system, and a total expected propagation delay from the sending system to the receiving system;
update, at the proxy, the asset information of the sending system to include the updated position; and
transmit the updated asset information from the proxy toward the receiving system, wherein the receiving system is configured to place the asset within application space on the receiving system using the updated asset information.

10. The apparatus of claim 9, wherein the proxy is one of:
a sending proxy associated with the sending system;
a receiving proxy associated with the receiving system; or
a common proxy associated with the sending system and the receiving system.

11. The apparatus of claim 9, wherein the proxy is a receiving proxy associated with the receiving system, wherein the processor is configured to determine the total expected propagation delay by:
determining a first expected propagation delay from the sending system to the receiving proxy;
determining a second expected propagation delay from the receiving proxy to the receiving system; and
determining the total expected propagation delay using the first expected propagation delay and the second expected propagation delay.

12. The apparatus of claim 11, wherein determining the first expected propagation delay comprises:
determining a send time at which the sending system transmits the asset information;
determining a receive time at which the receiving proxy receives the asset information; and
determining the first expected propagation delay using the send time and the receive time.

13. The apparatus of claim 9, wherein the proxy is a sending proxy associated with the sending system, wherein the processor is configured to determine the total expected propagation delay by:
determining a first expected propagation delay from the sending system to the sending proxy;
determining a second expected propagation delay from the sending proxy to the receiving system; and
determining the total expected propagation delay using the first expected propagation delay and expected propagation delay.

14. The apparatus of claim 13, wherein determining the first expected propagation delay comprises:
determining a send time at which the sending system transmits the asset information;
determining a receive time at which the sending proxy receives the asset information;
determining the first expected propagation delay using the send time and the receive time.

15. The apparatus of claim 9, wherein the proxy is a proxy associated with the sending system and the receiving system, wherein the processor is configured to determine the total expected propagation delay by:
determining a first expected propagation delay from the sending system to the proxy;
determining a second expected propagation delay from the proxy to the receiving system; and
determining the total expected propagation delay using the first expected propagation delay and the second expected propagation delay.

16. The apparatus of claim 9, wherein the processor is configured to determine the updated position by:
determining, for each of a plurality of original position coordinates of the original position, a position increment value, wherein each position increment value is determined by multiplying a trajectory component of the trajectory and the total expected propagation delay, wherein the trajectory component is associated with the original position coordinate; and
determining, for each of the plurality of original position coordinates, an updated position coordinate, wherein each updated position coordinate is determined by adding the respective position increment value associated with the original position coordinate to that original position coordinate.

17. A non-transitory computer-readable storage medium storing instructions which, when executed by a computer, cause the computer to perform a method for synchronizing placement of an asset within application space using a proxy, the method comprising:
receiving, at the proxy, asset information of a sending system, wherein the asset information of the sending system comprises an original position of the asset within application space on the sending system and a trajectory of the asset within application space on the sending system;
determining, at the proxy, an updated position adapted for placing the asset within application space on a receiving system, wherein the updated position is determined using the original position of the asset within application space on the sending system, the trajectory of the asset within application space on the sending system, and a total expected propagation delay from the sending system to the receiving system;
updating, at the proxy, the asset information of the sending system to include the updated position; and
transmitting the updated asset information from the proxy toward the receiving system, wherein the receiving system is configured to place the asset within application space on the receiving system using the updated asset information.

* * * * *